Aug. 20, 1963   R. HARTNAGEL   3,101,199
FLUID ASSEMBLIES AND SEALING INSERTS THEREFOR
Filed Jan. 30, 1961
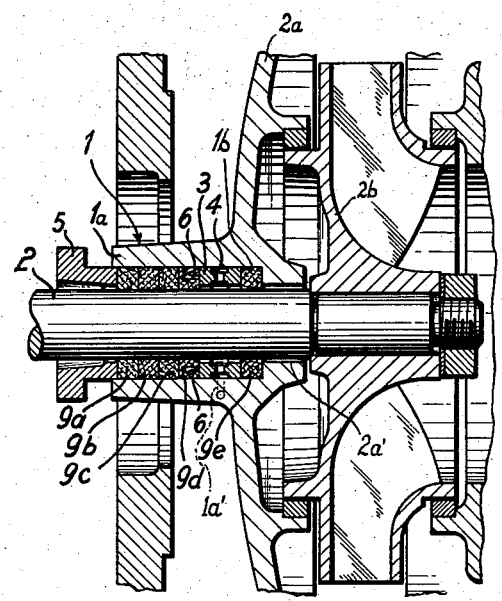
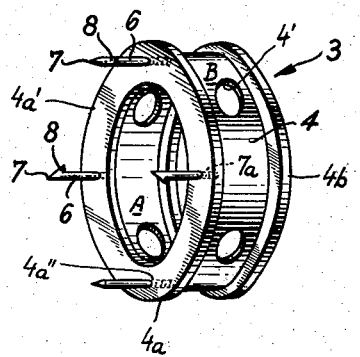
INVENTOR:
ROBERT HARTNAGEL
BY
Michael S. Striker
his ATTORNEY _United States Patent Office_ 3,101,199
Patented Aug. 20, 1963

3,101,199
FLUID ASSEMBLIES AND SEALING INSERTS THEREFOR
Robert Hartnagel, Frankenthal, Pfalz, Germany, assignor to Klein, Schanzlin & Becker Aktiengesellschaft Frankenthal, Pfalz, Germany
Filed Jan. 30, 1961, Ser. No. 85,570
11 Claims. (Cl. 277—9)

The present invention relates to fluid seals in general, and more particularly to a fluid sealing assembly which is especially suited for the sealing of shafts in centrifugal pumps and the like. The invention also relates to a fluid sealing ring and to a fluid sealing insert for use in such assemblies.

Many types of centrifugal pumps comprise fluid sealing assemblies which define sealing chambers between the pump case and the shaft. Such sealing chambers are connected to the pressure side of the pump so that the pressure of fluid in the chambers counteracts the pressure of fluid tending to escape along the periphery of the pump shaft. It is also known to provide a sealing chamber in the interior of a stuffing box, i.e. to utilize the space within the stuffing box as a sealing chamber by connecting this space with the pressure side of the pump. The sealing chamber then comprises a so-called sealing or seal ring which is formed with two parallel end faces and a rigid tubular body portion providing an annular fluid passage at the inner and outer sides thereof, and at least one aperture which connects the two passages. The end faces of the sealing ring abut against the customary soft annular packings and, by permitting the fluid to flow from the pressure side of the pump to the communicating passages defined by the sealing ring about the pump shaft and within the wall which surrounds the sealing chamber in the stuffing box, the latter is capable of providing a practically leakproof seal for the shaft.

A serious drawback of such constructions is that the rigid sealing ring becomes stuck in the chamber, particularly after extended periods of use, and that it is extremely difficult to remove the ring in the event that the packings require replacement, that the sealing chamber requires cleaning, or for any other reason. In such instances, it becomes necessary to take apart the entire machine in which the sealing ring is installed, e.g. to withdraw the shaft from the case of a centrifugal pump, because this is the only known way of providing access to a sealing ring which is tightly held by the wall of its sealing chamber.

An important object of the invention is to provide a sealing insert consisting of a rigid component and one or more soft packings which may be conveniently and rapidly removed from a sealing chamber.

Another object of the present invention is to provide a sealing ring which may be readily withdrawn from a sealing chamber without requiring a dismantling of the machine or apparatus in which the sealing chamber is utilized.

A further object of the invention is to provide a sealing ring of the just outlined characteristics which can be repeatedly inserted into and withdrawn from the interior of a stuffing box even if the shaft or another rotary body for whose sealing the stuffing box is utilized remains in its operative position.

Still another object of the invention is to provide a novel fluid sealing insert which combines the advantageous characteristics of a rigid sealing ring and of a soft packing annulus.

An additional object of the instant invention is to provide an improved stuffing box whose interior constitutes a sealing chamber and which embodies one or more fluid sealing inserts of the above described characteristics.

A concomitant object of the invention is to provide a sealing ring which is constructed and assembled in such a way as to facilitate rapid and convenient evacuation of a sealing chamber.

With the above objects in view, the invention resides in the provision of a rigid component, preferably assuming the form of a sealing ring, which is provided with means adapted to engage and to retain at least one soft packing in such a way that, when the packing is grasped by the customary packing worm, the rigid component is entrained with the packing to be conveniently and rapidly withdrawn from a sealing chamber. In accordance with a preferred embodiment of my invention, the retaining means comprises one or more elongated rod-shaped members which are secured to and project from one or both end faces of the rigid component, and each rod-shaped retaining member may be provided with one or more barbs or hooks which prevent a separation of the packing from the respective end face of the rigid component when the retaining members are caused to penetrate into the softer packing material.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is an axial section through a fluid sealing assembly in the form of a stuffing box whose interior constitutes a sealing chamber and which comprises a rigid component embodying one form of my invention; and FIG. 2 is an enlarged perspective view of the rigid component.

Referring now in greater detail to FIG. 1, there is shown a stuffing box 1 comprising a housing or box 1a which is integral with and projects outwardly from the case 2a of a centrifugal pump. It is assumed that the stuffing box 1 is installed in a single-stage centrifugal pump which comprises a single impeller 2b mounted on the pump shaft 2. This shaft extends through the stuffing box and its periphery must be properly sealed so as to prevent the escape of fluid from the interior of the pump case 2a. The open end of the sealing chamber 1b defined by the box 1a of the stuffing box 1 is sealable by a flanged gland 5. The manner in which the gland is connected to the box 1a is not shown; for example, a portion of the sealing chamber 1b may be internally threaded to receive an externally threaded portion of the gland, or the flange of the gland may be secured to the box by a series of threaded bolts or the like.

The sealing chamber 1b receives a novel rigid sealing component in the form of a ring 3 which is shown in greater detail in FIG. 2. This ring comprises an apertured tubular body portion 4 in the form of a short cylinder whose ends are connected to or integral with two annular flanges 4a, 4b. The flanges extend radially inwardly and outwardly from the tubular body portion 4 so as to define with the latter two annular passages A, B when the ring 3 is inserted into the sealing chamber 1b of the stuffing box 1. The inner passage A surrounds the periphery of the shaft 2, and the outer passage B is adjacent to the cylindrical wall of the chamber 1b. These passages communicate via apertures 4' so that a fluid, e.g. water, delivered from the pressure side of the centrifugal pump through one or more channels 1a' will counteract the pressure of fluid which tends to escape from the pump case 2a through the annular clearance 2a' formed between the bore of the case and the periphery of the shaft 2.

The exposed end face 4a' of the left-hand flange 4a abuts against a soft annular packing 9d and is connected to this packing by at least one but preferably more parallel retaining members shown in FIG. 2 in the form of uniformly spaced rod 6. Each of these rod shaped retaining members 6 has a pointed end portion 7 and an externally threaded end portion 7a which is screwed into a tapped bore 4a'' opening into the end face 4a' of the left-hand flange 4a. It will be noted that the bores 4a'' are provided on the periphery of a circle whose diameter equals or approaches the median diameter of the flange 4a, i.e. that the bores 4a'' may extend into the tubular body portion 4. Each retaining member 6 is provided with at least one hook or barb 8 which prevents separation of the comparatively soft packing 9d from the sealing ring 3 once the retaining members are caused to penetrate into the material of the packing. Consequently, whenever it becomes necessary to clean the sealing chamber 1b or to replace the packings, the operator merely engages the packing 9d with a conventional packing worm and withdraws the packing through the open end of the sealing chamber. A packing worm which may be utilized for extraction of packings 9a—9e is disclosed in U.S. Patent No. 2,066,598. The ring 3 participates in such movements so that the shaft 2 need not be withdrawn from the case 2a regardless of whether the ring must be repeatedly inserted into and/or removed from the sealing chamber. In the embodiment of FIG. 1, the sealing chamber 1b receives three non-connected annular packings 9a, 9b, 9c which are adjacent to the gland 5, the aforementioned packing 9d which is connected to and is movable with the sealing ring 3, and a fifth packing 9e which is adjacent to the end face of the right-hand flange 4b. Of course, if desired, the ring 3 may be formed with additional retaining members which project from the exposed end face of the right-hand flange 4b. However, it is normally sufficient to provide only one set of uniformly spaced retaining members 6 so as to insure connection with that annular packing which must be engaged by the worm in order to withdraw the ring from the sealing chamber. When the gland 5 is drawn tight, the pointed retaining members 6 will automatically penetrate into the packing 9d and the latter will be pressed against the end face 4a' of the left-hand flange 4a while the other flange 4b comes into abutment with the backing 9e.

It will be seen that I provide a rigid component which may be conveniently removed from its sealing chamber by utilizing only such tools which are necessary for the removal of soft packings. Thus, in order to evacuate the sealing chamber 1b, the operator removes the gland 5 to expose the outermost packing 9a which is then engaged by the customary packing worm to be removed through the open end of the sealing chamber and along the pump shaft 2 in a direction to the left, as viewed in FIG. 1. The packings 9b, 9c are removed in the same way, followed by the packing 9d which entrains the sealing ring 3. In the last step, the operator utilizes the packing worm once more to remove the right-hand packing 9e.

It is preferred to provide the retaining members 6 with one or more barbs 8 of such dimensions that the distance between the tips of these barbs and the axes of the respective retaining members does not exceed one-half the radial width of the flange 4a. This insures that the tips of the barbs 8 cannot come into contact with the wall of the chamber 1b regardless of in which direction the barbs may be turned provided, of course, that the bores 4a'' are substantially midway between the inner and outer outlines of the flange 4a.

The rigid component 3 and the soft packing 9d constitute an insert which may be introduced into and withdrawn from the sealing chamber 1b as a unit though, and as mentioned hereinabove, the rigid component and the packing may be introduced separately to be joined under pressure exerted by the gland 5. It will be readily understood that the ring shaped rigid sealing component may be utilized in all types of stuffing boxes as long as it can be introduced into the interior of a stuffing box, and also that it may be utilized in all other types of fluid sealing assemblies which are connected to the pressure side of a pump or like apparatus. In the event that the sealing chamber of an existing stuffing box is very short, i.e. that the stuffing box cannot accommodate two packings and a sealing ring, it might become necessary to form the gland with suitable recesses which accommodate the pointed end portions 7 of the retaining members, provided that these end portions penetrate through and project beyond the packing. Alternately, a conventional gland may be replaced by a prefabricated gland which is manufactured with a view to accommodate the pointed ends of retaining members.

It should be understood that the novel rigid component may be put to use whenever it must be accommodated in a difficultly accessible space. Furthermore, the retaining members may be provided on certain other types of rigid components in various sealing assemblies, e.g. on washers or the like, which might be useful between a pair of softer packings or at the bottom of a sealing chamber and which cannot be withdrawn with a packing worm.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A fluid-sealing insert for stuffing boxes and the like, particularly for sealing the shafts of centrifugal pumps, said insert comprising, in combination, a rigid ring having an end face and comprising retaining means projecting from said end face; and soft packing means adjacent to said end face, said retaining means connecting said packing means with said ring and preventing displacement of said packing means axially away from said ring when said packing means is subjected to forces tending to pull said packing means away from said ring in a direction generally parallel to the axis of said ring, and said packing means extending axially beyond said retaining means.

2. An insert as set forth in claim 1, wherein said retaining means comprises at least one barbed retaining member extending into and connecting said packing means with said ring.

3. An insert as set forth in claim 1, wherein said retaining means comprises a plurality of uniformly spaced substantially parallel retaining members.

4. A fluid-sealing insert for stuffing boxes, particularly for sealing the shafts of centrifugal pumps, said insert comprising, in combination, a ring; packing means located adjacent to and coaxial with said ring; and retaining means for connecting said packing means with said ring and preventing displacement of said packing means axially away from said ring when said packing means is subjected to forces tending to pull said packing means away from said ring in a direction generally parallel to the axis of said ring, and said packing means extending axially beyond said retaining means.

5. A fluid-sealing assembly comprising, in combination, a box defining a sealing chamber having an open end; a ring received in and having an end face directed toward the open end of said chamber, said ring comprising retaining means projecting from said end face; packing means received in said chamber adjacent to said end face, said retaining means extending into and connecting said packing means with said ring and preventing displacement of said packing means axially away from said ring when said packing means is subjected to forces tending to pull said packing means away from said ring in a direction generally parallel to the axis of said ring, and said packing means extending axially beyond said retaining means so that the ring will move with said packing means during withdrawal of the latter from said chamber through said open end thereof; and gland means spaced from said retaining means for sealing said open end.

6. As a novel article of manfacture, a rigid ring having an end face and retaining means fixed to and projecting from said end face for penetrating into and connecting a soft packing to said ring and for preventing displacement of said packing means axially away from said ring when said packing means is subjected to forces tending to pull said packing means away from said ring in a direction generally parallel to the axis of said ring.

7. A sealing ring as set forth in claim 6, wherein said retaining means comprises a plurality of barbed retaining members.

8. As a novel article of manufacture, a ring comprising a tubular body portion having a first and a second end; an annular flange at each end of said body portion, each flange extending radially inwardly and outwardly of said body portion and one of said flanges having an outer end face directed away from said body portion; and at least one barbed retaining member secured to and projecting from said outer end face of said one flange, said retaining member adapted to penetrate into and to connect an annular packing to said ring.

9. A sealing ring as set forth in claim 8, wherein said one flange has a tapped bore and said retaining member has a threaded end portion received in said bore.

10. A sealing ring as set forth in claim 8, wherein said one flange has a plurality of tapped bores each opening into said end face, said bores disposed on the periphery of a circle with a diameter approximating the median diameter of said one flange, there being a plurality of said barbed retaining members each having a pointed end portion and a threaded end portion the latter, threaded end portions being respectively received in said bores, and the barbs of said retaining members being respectively adjacent to said pointed end portions thereof, each barb having a tip and the distances between said tips and the axes of the respective retaining members being less than one-half the radial width of said one flange.

11. A sealing ring as set forth in claim 8, wherein said body portion is an apertured cylinder and wherein said flanges extend through equal distances radially inwardly and outwardly from said body portion, said retaining member secured to a median portion of said one flange.

References Cited in the file of this patent

UNITED STATES PATENTS

| 1,109,826 | Doble | Sept. 8, 1914 |
| 2,009,423 | Wheeler | July 30, 1935 |
| 2,066,598 | Wiessner | Jan. 5, 1937 |
| 2,366,729 | Hanson | Jan. 9, 1945 |
| 2,647,769 | Smith | Aug. 4, 1953 |
| 2,822,713 | Schmidt | Feb. 11, 1958 |
| 2,964,342 | Mainprize | Dec. 13, 1960 |

FOREIGN PATENTS

| 11,487 | Great Britain | Oct. 5, 1905 |
| 544,910 | Great Britain | May 1, 1942 |
| 583,818 | Great Britain | Dec. 31, 1946 |